United States Patent
Kuha (10) Patent No.: US 10,888,975 B1
(45) Date of Patent: Jan. 12, 2021

(54) VICE

(71) Applicant: Esa Kuha, Kolla (FI)

(72) Inventor: Esa Kuha, Kolla (FI)

( * ) Notice: Subject to any disclaimer, the term of this patent is extended or adjusted under 35 U.S.C. 154(b) by 34 days.

(21) Appl. No.: 16/482,478

(22) PCT Filed: Feb. 6, 2018

(86) PCT No.: PCT/FI2018/050084
§ 371 (c)(1),
(2) Date: Jul. 31, 2019

(87) PCT Pub. No.: WO2018/146380
PCT Pub. Date: Aug. 16, 2018

(30) Foreign Application Priority Data

Feb. 7, 2017 (FI) ...................................... 20175103

(51) Int. Cl.
*B25B 1/24* (2006.01)
*B25B 1/10* (2006.01)
*B23Q 3/06* (2006.01)

(52) U.S. Cl.
CPC ............ *B25B 1/2478* (2013.01); *B23Q 3/066* (2013.01); *B25B 1/103* (2013.01); *B25B 1/2442* (2013.01)

(58) Field of Classification Search
CPC ......... B25B 1/20; B25B 1/147; B25B 1/2478; B25B 1/2452; B25B 1/24; B25B 1/2442; B25B 1/2436; B25B 1/2473; B25B 5/003
See application file for complete search history.

(56) References Cited

U.S. PATENT DOCUMENTS

| | | | | |
|---|---|---|---|---|
| 287,271 A | * | 10/1883 | Gladwin | ................. B25B 1/103 |
| | | | | 269/244 |
| 534,345 A | * | 2/1895 | Nilsson | .................... B23Q 3/00 |
| | | | | 269/237 |
| 716,805 A | * | 12/1902 | Benedict | .................. B25B 1/20 |
| | | | | 269/107 |
| 719,348 A | * | 1/1903 | Long | ........................ B25B 1/20 |
| | | | | 269/129 |
| 1,523,978 A | | 2/1925 | Rougeot | |

(Continued)

FOREIGN PATENT DOCUMENTS

| | | |
|---|---|---|
| EP | 2090473 | 8/2009 |
| GB | 191005188 | 11/1910 |

(Continued)

OTHER PUBLICATIONS

The International Search Report (ISR) for PCT/FI2018/050084 dated Mar. 26, 2018, pp. 1-5.

(Continued)

*Primary Examiner* — Tyrone V Hall, Jr.
(74) *Attorney, Agent, or Firm* — McDonnell Boehnen Hulbert & Berghoff LLP (57) ABSTRACT

A vice including two clamping gaps (10, 20). A first body (1) includes a first jaw (11) and a second body (2) includes a second jaw (21), between which is formed a first clamping gap (10). A third body (3) is connected by an axis (9) to the first body (1), wherein the third body (3) includes a third jaw (31), which is adapted to rotate around the axis (9). The first body (1) includes a fourth jaw (41) opposite the third jaw (31), wherein between the third jaw (31) and the fourth jaw (41) is formed a second clamping gap (20).

9 Claims, 9 Drawing Sheets

(56) References Cited

U.S. PATENT DOCUMENTS

| | | | |
|---|---|---|---|
| 1,781,997 A * | 11/1930 | Berezowski | B25B 5/003 |
| | | | 269/41 |
| 2,062,326 A * | 12/1936 | Minch | B25B 1/103 |
| | | | 269/98 |
| 2,662,433 A | 12/1953 | Braun | |
| 4,935,638 A | 6/1990 | Stratka | |
| 5,601,300 A | 11/1997 | Fink | |
| 5,823,553 A | 10/1998 | Thompson | |
| 2002/0180135 A1 | 12/2002 | Yaeger | |
| 2011/0024962 A1 | 2/2011 | Zhang | |

FOREIGN PATENT DOCUMENTS

| | | |
|---|---|---|
| GB | 270587 | 5/1927 |
| GB | 2211118 | 6/1989 |
| JP | S56163854 A | 12/1981 |

OTHER PUBLICATIONS

Written Opinion of the International Searching Authority for PCT/FI2018/050084 dated Mar. 26, 2018, pp. 1-7.

\* cited by examiner

VICE

CROSS-REFERENCE TO RELATED APPLICATION

This application is a U.S. national phase of International Application No. PCT/FI2018/050084, filed Feb. 6, 2018, which claims priority to Finland Patent Application No. 20175103, filed Feb. 7, 2017, both of which are incorporated by reference herein in their entirety.

OBJECT OF THE INVENTION

The invention relates to tools. Specifically, the invention relates to a vice having two clamping gaps.

BACKGROUND OF THE INVENTION

Prior known are screw and bench vices having one or more clamping gaps opening in the same direction. In vices opening in the vertical direction, the tightening screw adjusts the clamping gap from the lateral direction, i.e. the direction of tightening of the vice is the same as the direction of movement of the jaws. Alternative directions for fastening and processing a workpiece are limited. By clamping from the lateral direction, a fastened workpiece often settles into a disadvantageous position, wherein working ergonomics suffer and the reliability of the workpiece remaining fastened is uncertain. The workpiece has a tendency to move between the clamping surfaces of the jaws, especially when a workpiece is loaded vertically. This occurs, for example, when drilling a workpiece downward from above with a manual drill. The fastening fails especially when using old and worn vices. In some cases, the fastening must be secured to a separate, solid base using locking pliers or corresponding aids.

One disadvantage when working with known screw bench vices is created, for example, when a plate-like workpiece is processed by sawing or cutting it with an angle grinder. The piece settles vertically between the jaws, wherein the person doing the work must hunch over or use other ergonomically poor working positions in order to perform the task. This decreases work safety and can cause a decrease in the quality of the work.

The anvil surface designed for pounding work with known screw bench vices is often small and located behind the jaw in a blind area. This leads to a situation, where the moving part of the body might be used as an anvil, damaging the screw bench vice.

For example, in repair shop use, workpieces are multiform and difficult to securely fasten into traditional screw bench vices. The fastening projections of the parts can be small or in wrong positions in terms of the desired fastening position. Examples of parts that are difficult to fasten are starter motors and alternators of automobiles.

SUMMARY OF THE INVENTION

The object of the invention is to obviate or at least alleviate the above said disadvantages. The object of the invention is to disclose a novel vice equipped with two clamping gaps. The invention is characterized by that, which is presented in the independent claim. The embodiments of the invention are presented in the dependant claims.

The invention relates to a vice including a first body, which includes a first jaw, and a second body, which includes a second jaw opposite the first jaw. Between the first jaw and the second jaw is formed a first clamping gap. A linear actuator is arranged to move the second body in the operating direction of the linear actuator in relation to the first body such that the first clamping gap is changed in the operating direction of the linear actuator. A vice according to the invention includes a third body, which is connected by an axis to the first body. The third body includes a third jaw, which is adapted to rotate around the axis. The first body includes a fourth jaw opposite the third jaw, wherein between the third jaw and the fourth jaw is formed a second clamping gap. In one embodiment, the first clamping gap changes linearly and the second clamping gap changes curvilinearly in relation to the distance to the axis.

In one embodiment, the third body includes means for adjusting the angle of a second sliding surface. This can be used to correct for changes due to wear or a situation, in which, for example, jaw protectors are placed around the jaws of the first clamping gap.

In one embodiment, the second body includes a first sliding surface oblique in relation to the operating direction of the linear actuator. The third body includes a second sliding surface, which is adapted to slide against the first sliding surface such that the movement of the linear actuator causes the rotation of the third body around the axis and the second clamping gap changes in a direction different from the operating direction of the linear actuator.

In one embodiment, the first clamping gap changes in the direction perpendicular in relation to the second clamping gap. The second clamping gap can be, for example, perpendicular in relation to the first clamping gap, wherein in the same vice are to be selected both vertical and horizontal fastenings.

In one embodiment, the third jaw includes a third clamping surface and the fourth jaw includes a fourth clamping surface, between which is formed a second clamping gap. The angle of the third clamping surface is adjustable such that the third clamping surface and the fourth clamping surface are parallel in the second clamping gap. In one embodiment, the angle of the fourth clamping surface is adjustable such that the third clamping surface and the fourth clamping surface are parallel in the second clamping gap. In one embodiment, both the third clamping surface and the fourth clamping surface are adjustable. Using an adjustable clamping surface, it is possible to compensate for a curvilinearly changing clamping gap such that the direction of the clamping surfaces is suitable for the workpiece.

In one embodiment, the vice includes means for locking the third body, wherein the second locking gap is to be kept in place as the linear actuator moves.

When the third body is locked, the movement of the linear actuator is limited in relation to the opening of the second locking gap.

In one embodiment, the linear actuator is a rotatable threaded rod fastened to the second body and the first body includes a threaded part corresponding to the threaded rod, wherein rotating the threaded rod moves the second body in relation to the first body.

In one embodiment, the third jaw is below the fourth jaw such that the third jaw lowers gravitationally as the linear actuator opens the second clamping gap. In one embodiment, the third jaw is above the fourth jaw such that the third jaw opens by an opening spring as the linear actuator opens the second clamping gap.

The using environments of the vice are, for example, machine shops, repair shops or carpentry workshops. The vice allows versatile fastening possibilities. Using one vice it is possible to fasten different kinds of pieces quickly and sturdily. The vice allows the clamped fastening of a workpiece from different directions, even if the vice were to be sturdily fastened to its base. For example, vertical and horizontal fastenings are to be implemented by one vice. In one embodiment, a first body to be fixedly installed includes a second jaw of both clamping gaps, wherein the upper part of the first body can be shaped flat and suitable for an anvil. The structure is to be shaped slender, wherein workpieces of different shapes can be freely placed in the vice. The first clamping gap and the second clamping gap can be shaped into different sizes, wherein the first clamping gap is suitable for large workpieces, the second clamping gap being, in a manner of forceps, tall and narrow. In this example, the second clamping gap is suitable for small pieces requiring great precision in the clamping.

LIST OF FIGURES

In the following, the invention is described in more detail by means of embodiment examples with reference to the accompanying drawing, in which.

DETAILED DESCRIPTION OF THE INVENTION

Figure 1:
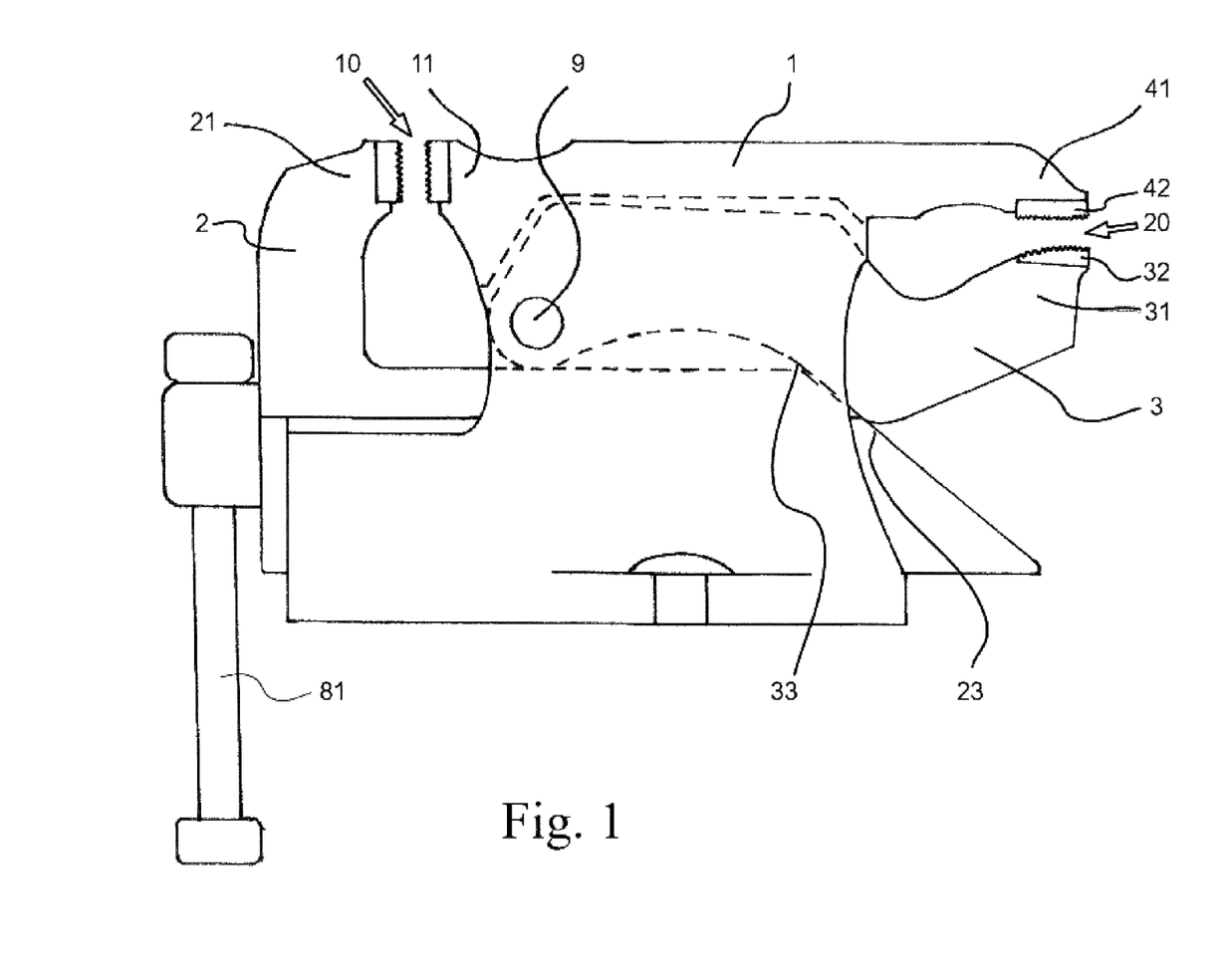
FIG. 1 shows a lateral view of an embodiment of the vice.

FIG. 1 shows an example of the vice, in which the first body 1 is fixedly installed on the base and the second body 2 moves in relation to the first body under the influence of the linear actuator 8. In this example, the linear actuator 8 is a threaded rod, wherein the vice is a bench vice to be fixedly installed. The threaded rod 8 is rotated manually by a wrench 81 fastened to its other end. The first body 1 includes a counter-thread, against which the threaded rod 8 is rotatable. In one example, the linear actuator is hydraulically operated, in one example, electrically operated. The linear actuator 8 can be controlled by an operating element separately to be connected thereto.

The first body 1 includes a first jaw 11 and the second body 2 a second jaw 21 opposite the first jaw 11. Between the first jaw 11 and the second jaw 21 is formed the first clamping gap 10, which changes linearly in the operating direction of the linear actuator 8. The first body also includes a fourth jaw 41. The first jaw 11 and the fourth jaw 41 are, according to one embodiment, a distance from each other, wherein to the upper part of the first body 1 can be formed an anvil part.

A third body 3 is articulated by an axis 9 to the first body. The third body 3 includes a third jaw 31 opposite a fourth jaw 41. Between the third jaw 31 and the fourth jaw 41 is formed a second clamping gap 20. The second clamping gap 20 opens curvilinearly in relation to the distance between the third jaw 31 and the axis 9.

In one embodiment and in the example of FIG. 1, the third body 3 moves in response to the movement of the second body 2. The linear actuator 8 causes a simultaneous movement of the second body 2 and the third body 3. The second body 2 includes a first sliding surface 23 oblique in relation to the operating direction of the linear actuator 8. The third body includes a second sliding surface 33, which is adapted to slide against the first sliding surface 23 such that the movement of the linear actuator 8 causes the rotation of the third body 3 around the axis 9. In one embodiment, the second sliding surface 33 is shaped curvilinearly to match with the common contact surface with the first sliding surface 23 with various opening angles of the clamping gap 20. The second clamping gap 20 changes in a direction different from the operating direction of the linear actuator 8. The second clamping gap 20 changes according to a curvilinear radius. In the embodiment of FIG. 1, the first clamping gap 10 is open upwards and the second clamping gap 20 is open laterally. In one embodiment, the second clamping gap 20 is perpendicular in relation to the first clamping gap, wherein the angle between these is to be defined by the angle between the first jaw 11 and the fourth jaw 41 of the first body 1. The sliding surfaces 23, 33 can be straight, curvilinear or convex. The movement of the third body 3 in response to the movement of the linear actuator 8 is to be adapted by the shape of the sliding surfaces. The sliding surfaces 23, 33 can be coated with a material suitable for sliding, the other body parts being, for example, cast steel. The coating material can be a harder material to reduce friction and wear. A suitable hardness of the sliding surface can also be achieved by tempering the second body 2 and/or the third body 3.

In one embodiment, the first body 1 is fixedly installed on a base. In this case, the base of the first body 1 forms a part of the first body 1. The fourth jaw 41, included in the first body 1, can be a part of the base. In one embodiment, the third jaw 31 clamps a workpiece from above against the base, which functions as the fourth jaw 41.

In one embodiment, the angle of the first sliding surface 23 in relation to the operating direction of the linear actuator 8 is 10 . . . 60 degrees, in one embodiment, approximately 40 degrees. In one embodiment, the angle is adjustable in the range of 5 . . . 90 degrees; the second sliding surface 33 can be at a perpendicular angle in relation to the first sliding surface 23, for example, in the embodiment of FIG. 8. The magnitude of the angle influences the speed of change of the second clamping gap 20 in relation to the movement of the linear actuator 8. The angle is to be set suitable so that the force caused by the linear actuator 8 is adequate to form an adequate clamping force in the second clamping gap 20. In this example, the tightening movement of the vice is impeded, provided that there is a workpiece in either the first clamping gap 10 or the second clamping gap 20.

The third jaw includes a third clamping surface 32 and the fourth jaw a fourth clamping surface 42, wherein a second clamping gap 20 is formed between these clamping surfaces. In one embodiment, the third clamping surface 32 is shaped curvilinearly, wherein, for workpieces of different sizes, there can be achieved at least a partial tangential contact surface in relation to the fourth clamping surface 42. In one embodiment, the angle of either the third clamping surface 32 or the fourth clamping surface 42 is to be adjusted suitable for the contact surface of the workpiece. In one embodiment, both clamping surfaces 32, 42 are adjustable.

In one embodiment, the third clamping surface 33 of the third jaw 31 is equipped with sections to be adjusted by wedges or screws, which sections allow mutual orientation of the clamping surfaces 32, 42.

Figure 7:
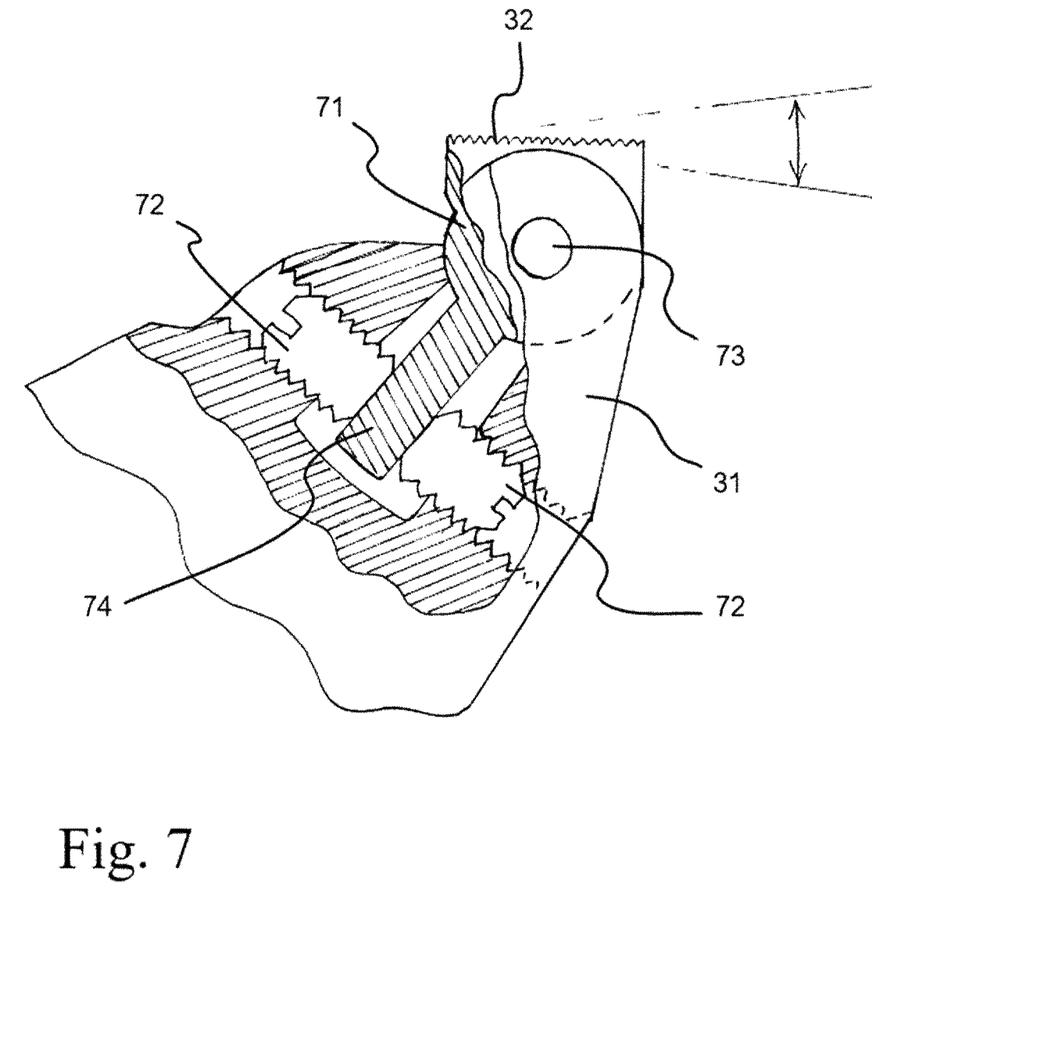
FIG. 7 shows a partially sectioned example of means for adjusting the angle of the clamping surface.

FIG. 7 shows an example of means for adjusting the clamping surface. In the example, a third clamping surface 32 is adjusted, but a corresponding functionality is to be implemented in the fourth clamping surface 42. The third clamping surface includes an adjustable jaw section 71 to be rotated around the axis 73. The adjustable jaw section 71 can be supported by the round seat part formed in the third jaw 31. The angle of the third clamping surface is to be adjusted and locked with two adjustment screws 72, which tighten against the adjustment flange 74 of the adjustable jaw section.

Figure 2:
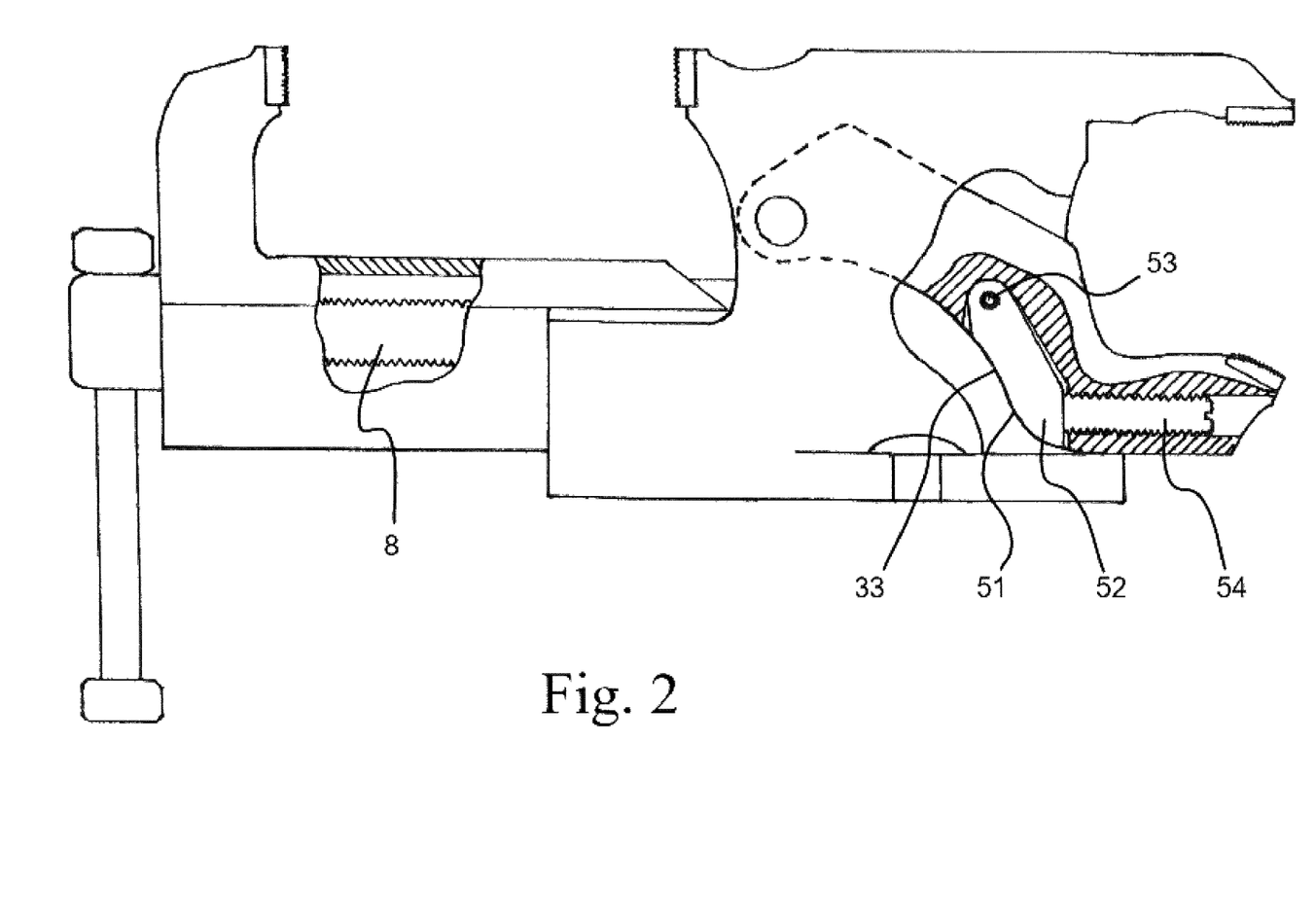
FIG. 2 shows a partially sectioned lateral view of an embodiment of the vice.

FIG. 2 shows an embodiment, in which the third body 3 includes means 51 for adjusting the angle of the second sliding surface 33. The first sliding surface 23 or the second sliding surface 33 may wear while in use, wherein the response of the sliding surfaces in relation to the movement of the linear actuator 8 may change. By adjusting the angle of the second sliding surface 33, correction can be made for changes caused by wear. In one embodiment, the means 51 include a flange 52 hinged on an axis 52, the surface of which forms a second sliding surface 33. The protrusion of the flange 52 and its rotation in relation to the axis 53 can be adjusted with a screw 54, wherein the interrelationship between the sliding surfaces 23, 33 and response to the linear actuator 8 are also changed. Adjusting the angle of the sliding surface can improve the grip of the workpiece or the usability of the vice, for example, when the clamping surface 32, 42 is equipped with a jaw protector or there is wear in the mechanism. Examples of materials used in a jaw protector are aluminium, rubber or some other suitable padding.

Figure 3:
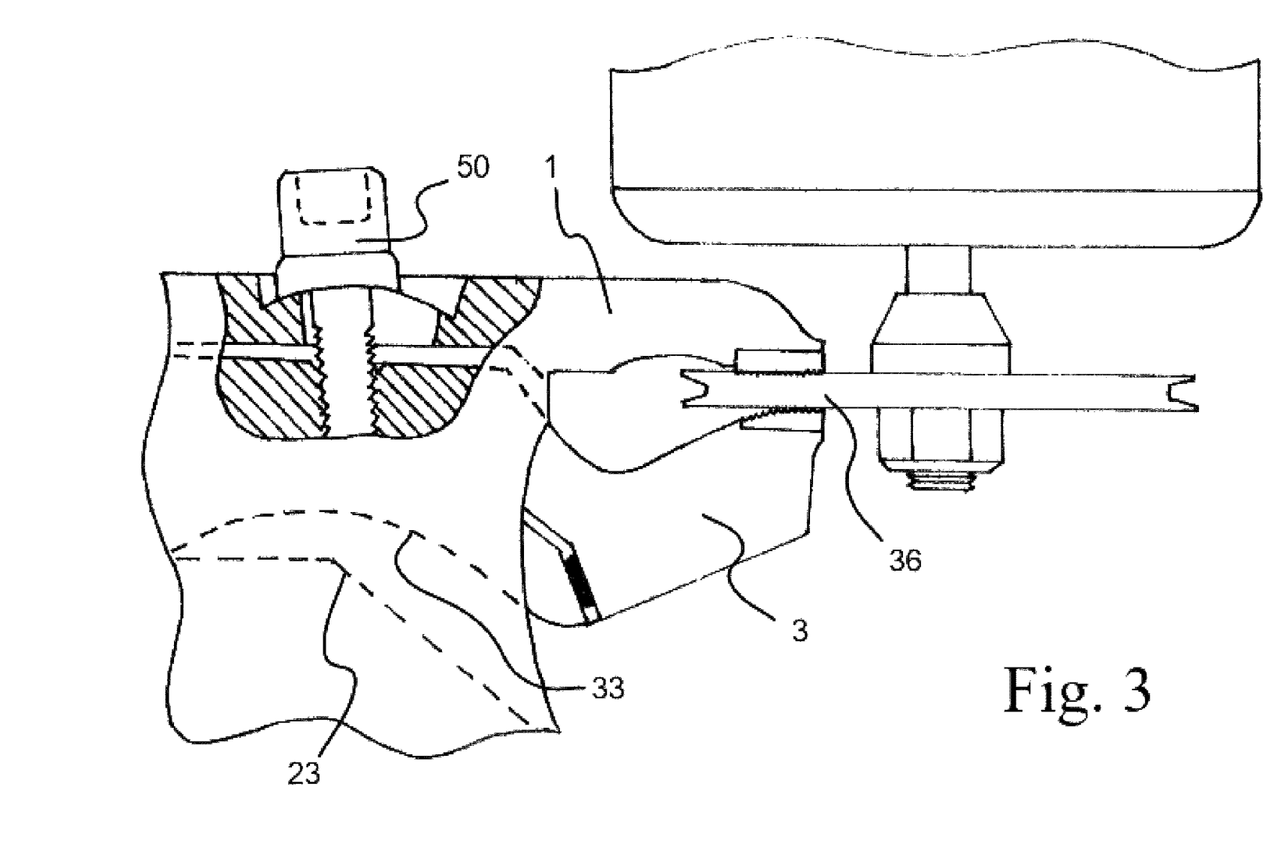
FIG. 3 shows a partially sectioned detail of an embodiment, in which the vice includes means for locking the third body.

FIG. 3 shows an embodiment, in which the vice includes means 50 for locking in place the third body 3. In FIG. 3, there is a workpiece 36 in the second clamping gap 20. One example of the means 50 is a locking screw through the first body 1, wherein there is a corresponding thread in the third body 3. By tightening the locking screw, the second locking gap 20 is to be kept in place as the linear actuator 8 moves. In this example, the movement of the linear actuator 8 is limited such that the first clamping gap 10 is to be changed only in an area of operation that is proportionally smaller than the second clamping gap 20.

In the example of FIG. 1, the third jaw 31 is below the fourth jaw 41 such that the third jaw 31 lowers gravitationally as the linear actuator 8 opens the second clamping gap 20. In this case, the first clamping gap 10 is open upwards and the second clamping gap 20 is open laterally. The vice can also be installed in a second position, upside down or vertically in relation to the exemplary figure. In this case, in one embodiment, the return movement of the third body 3 is intensified by a spring.

Figure 4:
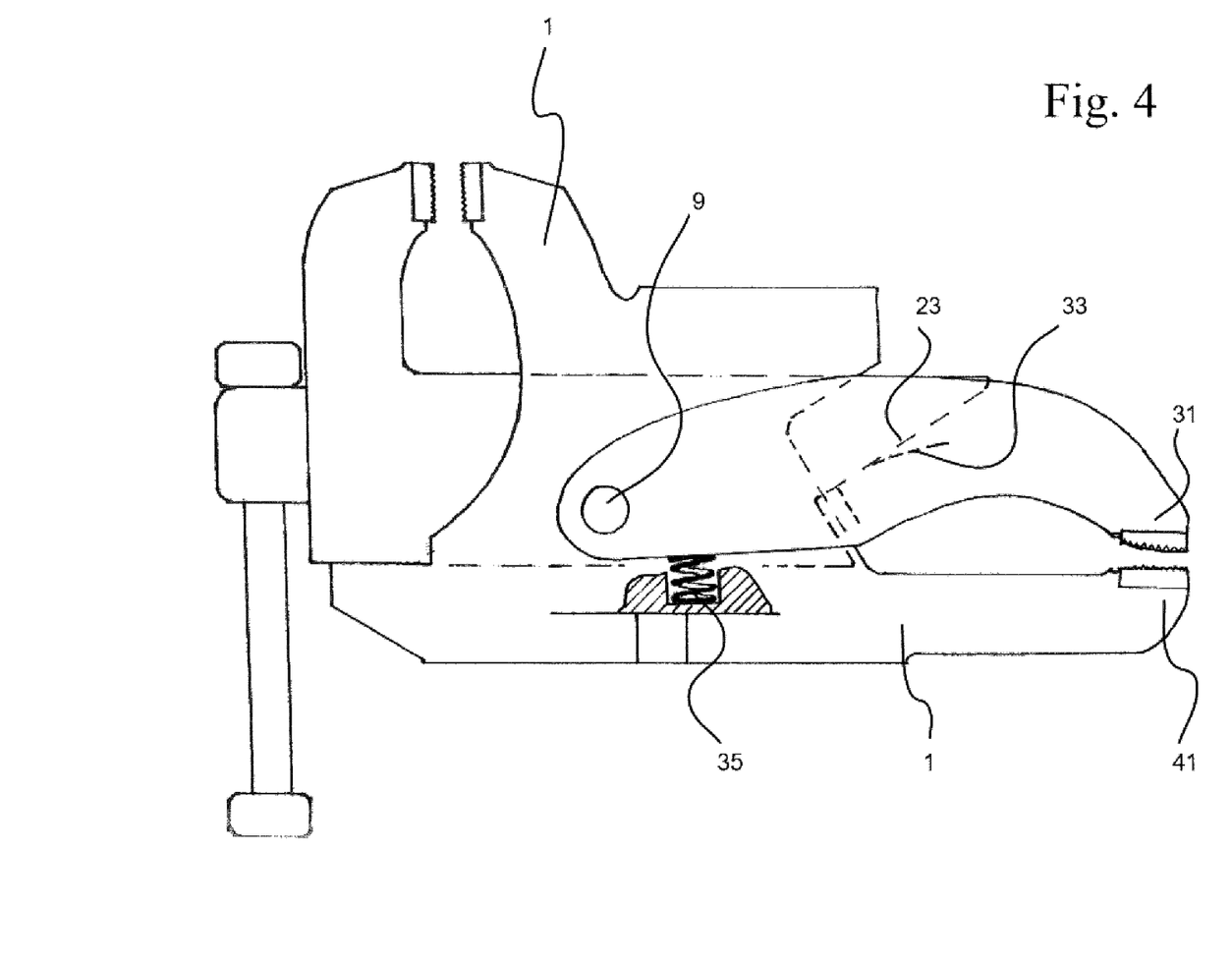
FIG. 4 shows an embodiment of the vice, in which the third jaw is above the fourth jaw.

FIG. 4 shows an embodiment, in which the third jaw 31 is above the fourth jaw 41. The first body 1 controls the movement of the third body 3 and the third body 3 rotates around the axis 9 fastened to the first body 1. In the example of FIG. 4, the third jaw 31 opens by an opening spring 35 as the linear actuator 8 opens the second clamping gap 20. In one embodiment, the vice of FIG. 4 is fastened upside down, wherein the third jaw 3 opens gravitationally. In this example, the first sliding surface 23 and the second sliding surface 33 are adapted inside the third body 3, wherein the sliding surface is protected from outside objects and, for example, work clothes getting caught in between. In one embodiment, the first sliding surface 23 and the second sliding surface 33 are shaped in connection with the third body, outside of a line defined by the axis and the third jaw. In this case, the sliding surfaces are to be easily cleaned of possible impurities, which could impair the function of the sliding surfaces.

Figure 5:
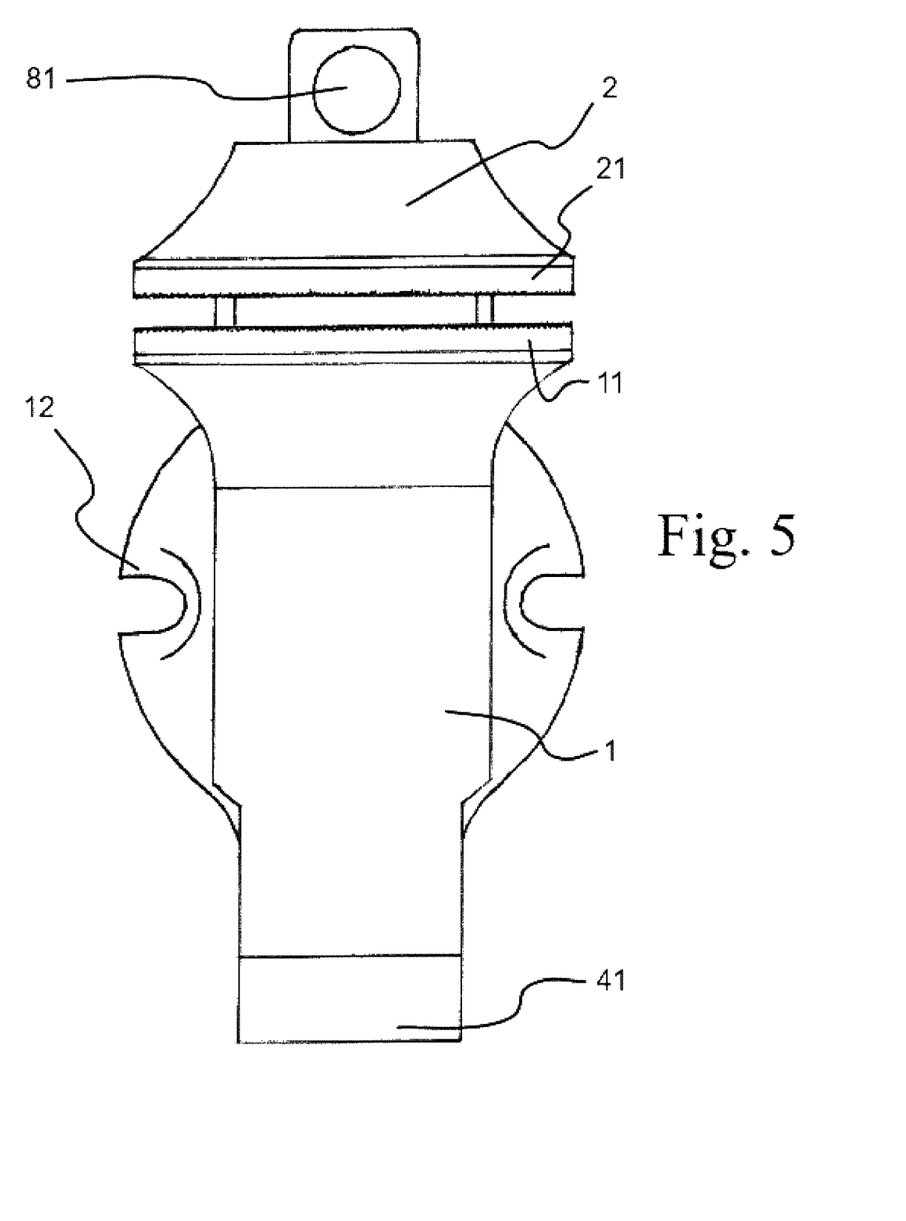
FIG. 5 shows a top view of an embodiment of the vice.

FIG. 5 shows a top view of an embodiment, in which the fourth jaw 41 of the first body 1 is above the third body 3. The upper part of the first body 1 is to be shaped as an anvil. The lower part of the first body 1 includes a fastening part 12, from which the vice can be fastened to its base, for example, with a bolt.

Figure 6:
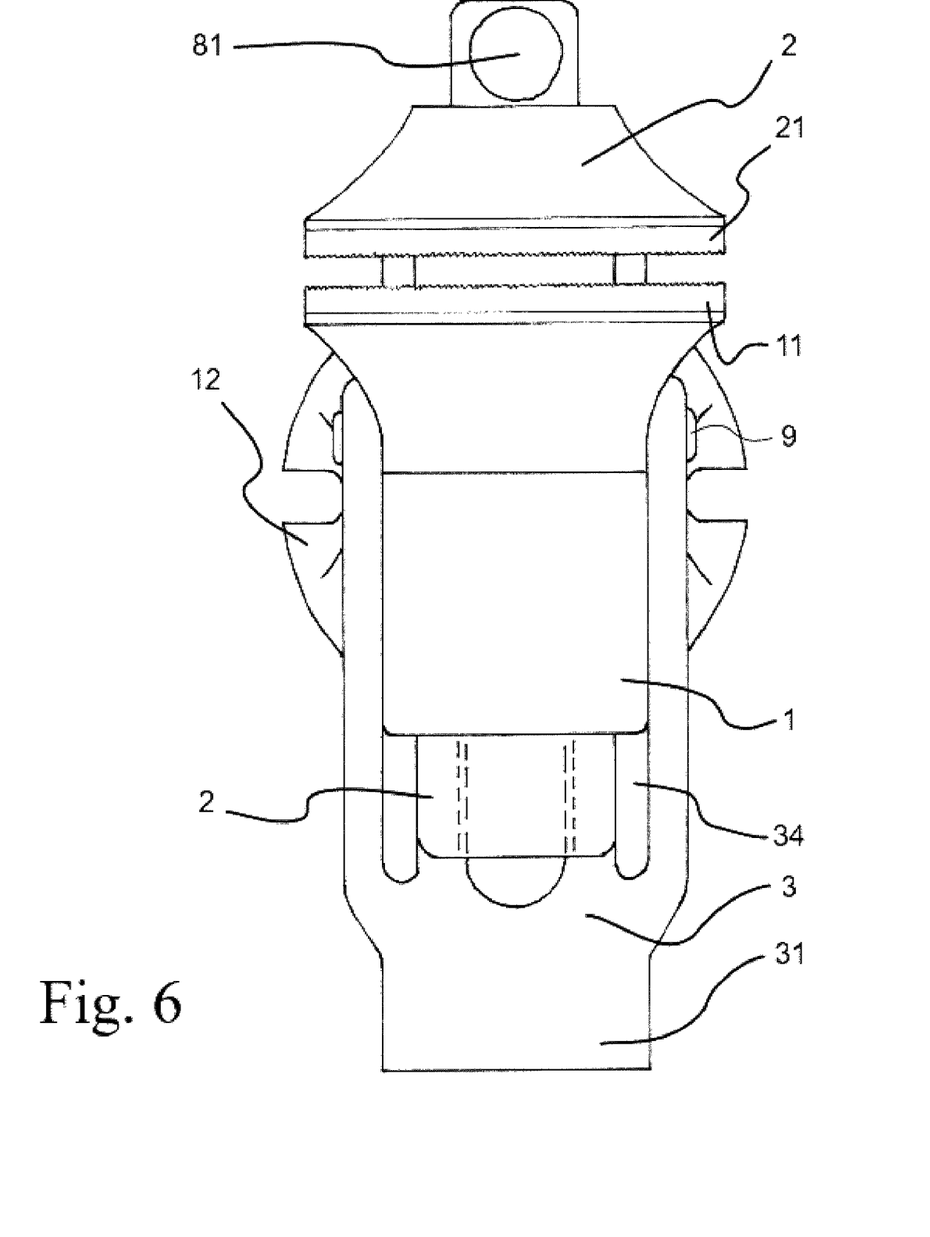
FIG. 6 shows a top view of an embodiment of the vice.

FIG. 6 shows a top view of an embodiment, in which the third jaw 31 of the third body 3 is above the first body 1. In this example, the third body 3 includes elongated openings 34, along which the second body 2 and the third body 3 are directed in the direction of the movement of the linear actuator 8.

Figure 8:
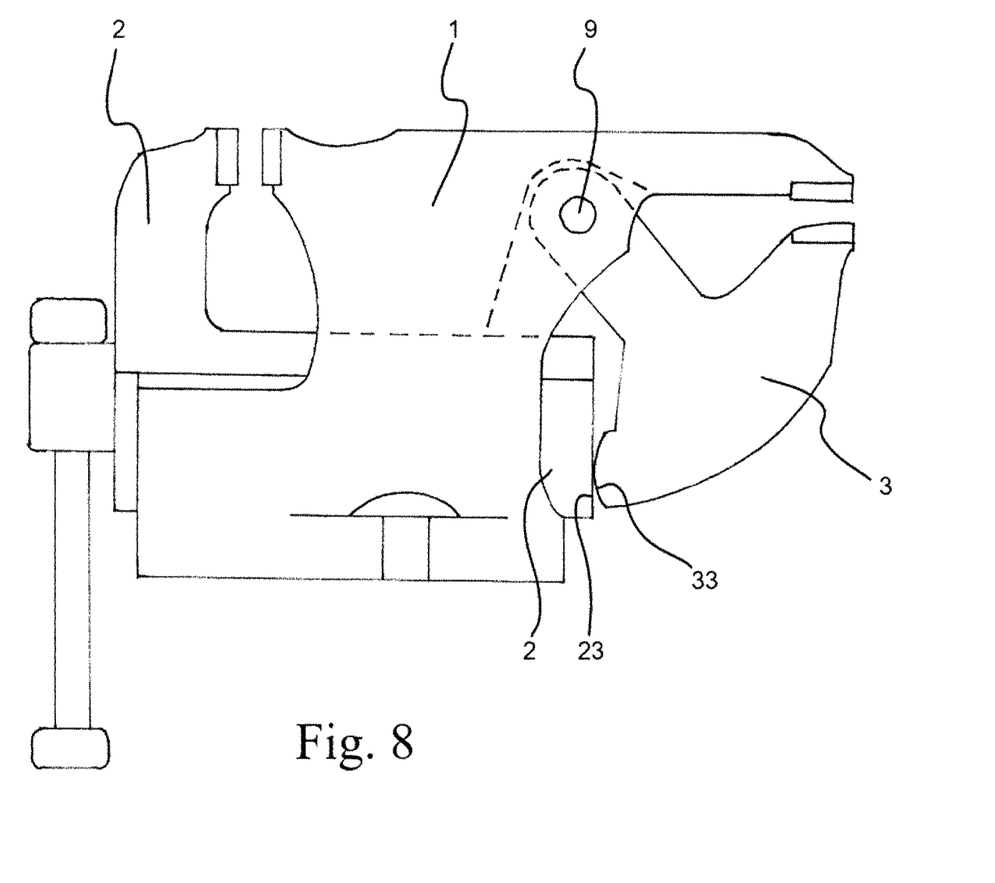
FIG. 8 shows a lateral view of an embodiment of the vice.

FIG. 8 shows an embodiment of the vice, in which the third body 3 rotates around the axis 9 in response to the movement of the second body 2. The first sliding surface 23 presses against the second sliding surface 33. In this embodiment, the angle between the first sliding surface 23 and the second sliding surface 33 is perpendicular, because the second sliding surface 33 is shaped curvilinearly to correspond to the surface pressure of the first sliding surface 23. The linear actuator 8 causes the movement of the second body 2, wherein the third body 3 rotates around the axis 9 and the second clamping gap 20 changes curvilinearly. The linear actuator 8 is able to move freely, wherein the contact surfaces are to be cleaned or lubricated.

Figure 9:
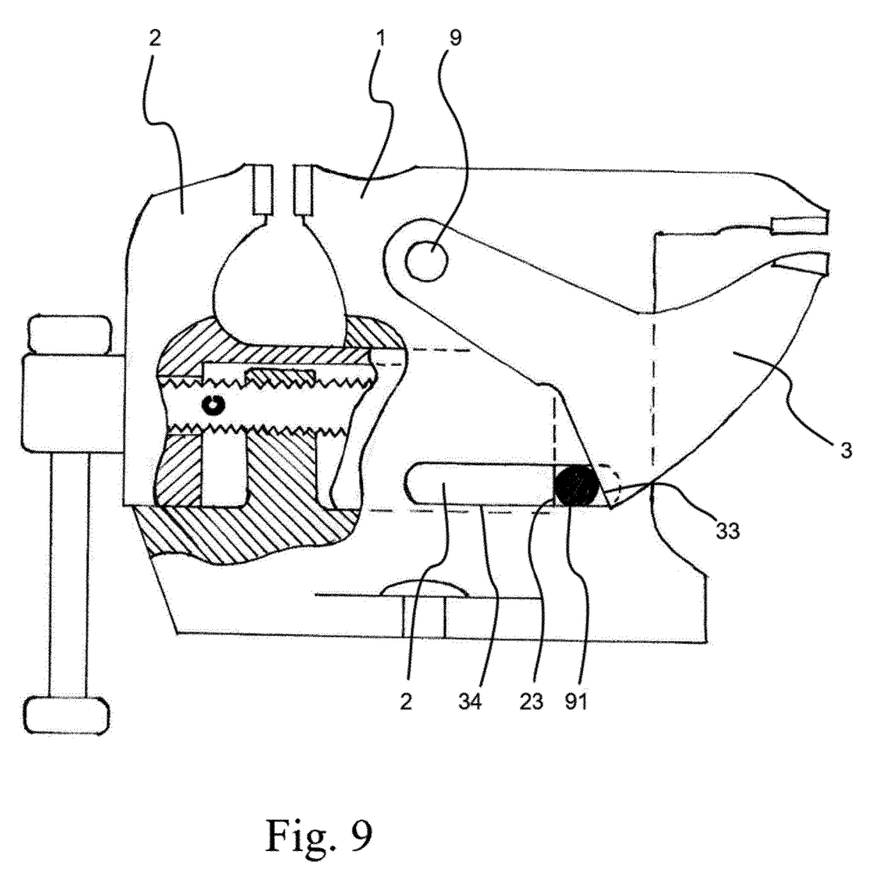
FIG. 9 shows a partially sectioned lateral view of an embodiment of the vice.

FIG. 9 shows an embodiment of the vice, in which the first body 1 includes an elongated opening 34. Between the second body 2 and the second sliding surface 33 is arranged an intermediate piece 91. The intermediate piece 91 can be, for example, a through axis, bolt, screwdriver shaft or some workpiece. The intermediate piece 91 is to be clamped between the first sliding surface 23 and the second sliding surface 33. The sliding surfaces and the elongated openings or other forms of the vice can be adapted such that the elongated opening can be used, for example, for bending a pipe-like piece. The linear actuator 8 is able to move freely, wherein the contact surfaces are to be cleaned or lubricated.

The invention is not limited to only the embodiment examples presented above, rather many variations are possible within the scope of the inventive idea defined by the claims.

The invention claimed is:

1. A vice including:
    a first body, which includes a first jaw;
    a second body, which includes a second jaw opposite the first jaw, wherein between the first jaw and the second jaw is formed a first clamping gap;
    a linear actuator, which is arranged to move the second body in the operating direction of the linear actuator in relation to the first body such that the first clamping gap changes in the operating direction of the linear actuator;
    a third body, which is connected by an axis to the first body;
    the third body includes a third jaw, which is adapted to rotate around the axis;
    the first body includes a fourth jaw opposite the third jaw; wherein between the third jaw and the fourth jaw is formed a second clamping gap;
    the second body includes a first sliding surface oblique in relation to the operating direction of the linear actuator; and the third body includes a second sliding surface, which is adapted to slide against the first sliding surface such that the movement of the linear actuator causes the rotation of the third body around the axis and the second clamping gap changes in a direction different from the operating direction of the linear actuator.

2. A vice according to claim 1, wherein the third body includes means for adjusting the angle of the second sliding surface.

3. A vice according to claim 1, wherein the first clamping gap changes in the direction perpendicular in relation to the second clamping gap.

4. A vice according to claim 1, wherein the third jaw includes a third clamping surface and the fourth jaw includes a fourth clamping surface, between which is formed a second clamping gap, and the angle of the third clamping surface is adjustable by adjustment means such that the third clamping surface and the fourth clamping surface are parallel in the second clamping gap.

5. A vice according to claim 1, wherein the third jaw includes a third clamping surface and the fourth jaw includes a fourth clamping surface, between which is formed a second clamping gap, and the angle of the fourth clamping surface is adjustable by adjustment means such that the third clamping surface and the fourth clamping surface are parallel in the second clamping gap.

6. A vice according to claim 1, comprising means for locking the third body, wherein the second locking gap is to be kept in place as the linear actuator moves.

7. A vice according to claim 1, wherein the linear actuator is a rotatable threaded rod fastened to the second body, and the first body includes a threaded part corresponding to the threaded rod, wherein rotating the threaded rod moves the second body in relation to the first body.

8. A vice according to claim 1, wherein the third jaw is below the fourth jaw such that the third jaw lowers gravitationally as the linear actuator opens the second clamping gap.

9. A vice according to claim 1, wherein the third jaw is above the fourth jaw such that the third jaw opens by an opening spring as the linear actuator opens the second clamping gap.

* * * * *